US012441384B2

(12) United States Patent
Streicher

(10) Patent No.: US 12,441,384 B2
(45) Date of Patent: Oct. 14, 2025

(54) SHOPPING CART

(71) Applicant: Mathias Streicher, Grinzens (AT)

(72) Inventor: Mathias Streicher, Grinzens (AT)

( * ) Notice: Subject to any disclaimer, the term of this patent is extended or adjusted under 35 U.S.C. 154(b) by 0 days.

(21) Appl. No.: 17/951,838

(22) Filed: Sep. 23, 2022

(65) Prior Publication Data

US 2023/0021083 A1 Jan. 19, 2023

Related U.S. Application Data

(63) Continuation of application No. 15/769,829, filed as application No. PCT/EP2016/070529 on Aug. 31, 2016, now abandoned.

(30) Foreign Application Priority Data

Oct. 20, 2015 (DE) ...................... 10 2015 013 592.9

(51) Int. Cl.
*B62B 5/06* (2006.01)
*B62B 3/14* (2006.01)

(52) U.S. Cl.
CPC . *B62B 5/06* (2013.01); *B62B 3/14* (2013.01)

(58) Field of Classification Search
CPC .................................... B62B 5/06; B62B 3/14
See application file for complete search history.

(56) References Cited

U.S. PATENT DOCUMENTS

| | | | | |
|---|---|---|---|---|
| 3,173,705 A * | 3/1965 | Du Puy | ..................... | B62B 1/18 280/47.31 |
| 5,153,966 A * | 10/1992 | Godwin | ................... | B62B 5/06 298/3 |
| 5,427,394 A * | 6/1995 | Lauto | ........................ | B62B 3/02 280/47.35 |
| 7,866,686 B2 * | 1/2011 | Conaway | ................ | B62B 1/208 280/653 |
| 8,931,744 B1 * | 1/2015 | McLafferty | ............... | B62B 5/06 248/278.1 |
| D749,286 S * | 2/2016 | Sherman | ................... | B62B 3/14 D34/27 |
| 9,598,097 B2 * | 3/2017 | Sherman | ................ | B62B 5/064 |
| 11,945,490 B2 * | 4/2024 | Nishida | ..................... | B62B 3/14 |

(Continued)

FOREIGN PATENT DOCUMENTS

DE         29508411 U1    8/1995
DE         29612191 U1    8/1996

(Continued)

OTHER PUBLICATIONS

Shopping Cart Sizing Chart. ShoppingCartMart.com, 2013 [Retrieved on Oct. 15, 2013] Retrieved from the internet:<URL: https://web.archive.org/web/20131015052016/https:/www.shoppingcartmart.com/shopping-cart-sizes>. (Year: 2013).*

(Continued)

*Primary Examiner* — Bryan A Evans

(74) *Attorney, Agent, or Firm* — DITTHAVONG, STEINER, & MLOTKOWSKI

(57) ABSTRACT

A supermarket trolley, the gripping region of the handle of said trolley be arranged such that when the handle is gripped for pushing the trolley, the lower arms assume a position, the direction of movement of the lower arms being aligned to that of the body.

14 Claims, 2 Drawing Sheets

(56) References Cited

U.S. PATENT DOCUMENTS

| | | | |
|---|---|---|---|
| 2009/0058047 A1* | 3/2009 | Brosh | B62B 1/20 |
| | | | 280/653 |
| 2013/0305486 A1* | 11/2013 | Sonnendorfer | B62B 3/1416 |
| | | | 16/111.1 |
| 2014/0151971 A1* | 6/2014 | Workman | B62B 5/06 |
| | | | 280/47.31 |
| 2015/0197262 A1* | 7/2015 | Sonnendorfer | B62B 3/14 |
| | | | 280/47.35 |

FOREIGN PATENT DOCUMENTS

| | | |
|---|---|---|
| DE | 29611679 U1 | 9/1996 |
| DE | 29700857 U1 | 3/1997 |
| DE | 202012000348 U1 | 2/2012 |
| DE | 102011104321 A1 | 12/2012 |
| EP | 2072371 A2 | 6/2009 |

OTHER PUBLICATIONS

English Translation of the International Preliminary Report on Patentability issued in International Application No. PCT/EP2016/070529, dated Apr. 26, 2018.

International Search Report and Written Opinion in issued in International Application No. PCT/EP2016/070529, dated Nov. 8, 2016.

* cited by examiner

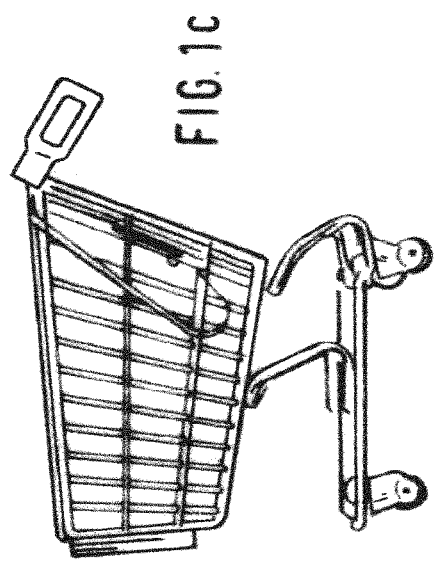
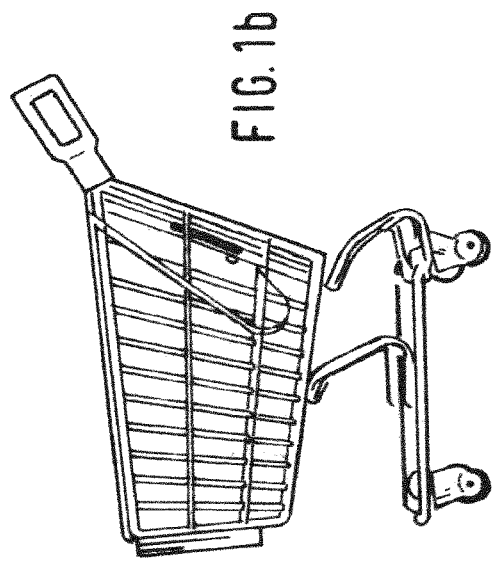
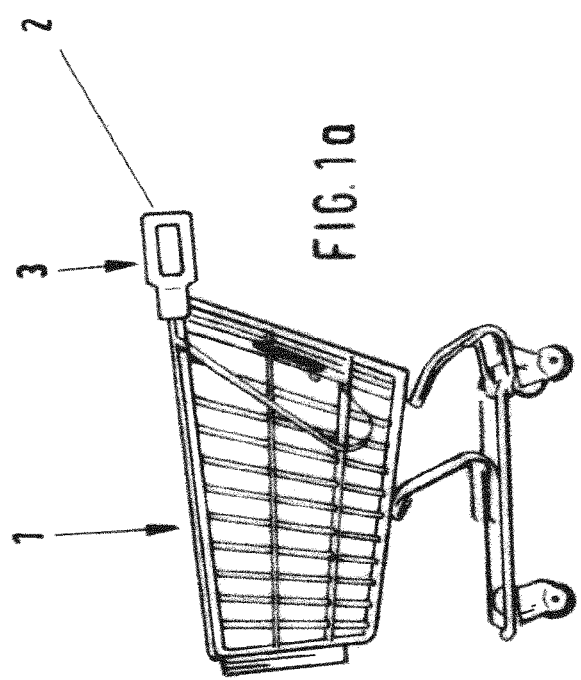

SHOPPING CART

RELATED APPLICATIONS

This application is a continuation of U.S. Ser. No. 15/769,829, filed on Apr. 20, 2018, which is a National Phase § 371 application of PCT/EP2016/070529, filed on Aug. 31, 2016, which claims priority to German Application No. 10 2015 013 592 9, filed on Oct. 20, 2015, the contents of each are hereby incorporated by reference in their entirety.

FIELD

The invention relates to a shopping cart having one or two push handles for pushing the same.

BACKGROUND

Shopping carts serve in a shop, for example in a supermarket, to store the selected goods and transport them to the checkout.

In conventional shopping carts, a bar attached transversely to the longitudinal direction of the cart or to the pushing direction serves as a push handle for pushing the cart.

SUMMARY OF THE INVENTION

The purpose of the invention is to provide a shopping cart whose push handle or push handles are arranged in such a way that they positively influence the buying behavior of the consumer.

The invention is based on the finding that the arm position of the buyer pushing the shopping cart, which is determined by the realization of the push handle, or more precisely, the grip area of the push handle, has an influence on the purchasing behavior.

The object of the invention is a shopping cart which is characterized in that the gripping area of the push handle is arranged in the longitudinal direction of the shopping cart or at an angle of up to 30° towards the longitudinal direction in horizontal and/or vertical direction in such a way that when naturally gripping the push handle for pushing the cart, the forearms assume a position whose direction of movement is directed toward the body.

Preferably the gripping area of the push handle is arranged in such a way that when naturally gripping the push handle for pushing the cart, the elbows are slightly flexed, and the palms of the hands are facing each other.

The gripping region is that region of the push handle which is encompassed by the hand when the natural gripping of the push handle for pushing the cart.

The direction of movement of the forearm toward the body is defined in such a way that, if the movement of the forearms were continued—(when, theoretically speaking, the push handle is released but the movement of the forearms is continued)—this is directed toward the body. If, for example, a crossbar attached to the shopping cart is gripped from below, the continuation of the movement of the forearms causes these to hit the body in the chest area. In contrast, when pushing the cart forward with outstretched arms, the forearms are led further away from the body. For two push handles attached horizontally to the longitudinal axis of the shopping cart, if the movement were continued, when the push handles are gripped from the outside, i.e., the side remote from the center of the cart, the forearms would carry out a movement of crossing each other on the chest and impinging there—a proximal movement. If the same handles were gripped from the inside, which, however, cannot be considered ergonomically, then the movement of the forearms would occur away from the body—distal movement.

The direction of movement of the forearms toward the body can also be described in such a way that when an object, e.g., a ball, is captured from below or laterally and the object is led to the upper body, this describes a direction of movement toward the body, in contrast to the fact that the object is pushed forward with the hands, i.e., away from the body.

In the shopping cart according to the invention, a push handle for gripping with both hands can be provided, but it is preferable to have two separate push handles on the cart. The gripping area of the push handle is preferably arranged in the longitudinal direction of the shopping cart, which by definition is the pushing direction. Since such handgrips are naturally clasped from the outside, a position of the forearms is automatically ensured such that their direction of movement is directed toward the body.

Essentially gripped in longitudinal direction such that the push handles are arranged at an angle to the longitudinal direction of the shopping cart in a horizontal and/or vertical direction, wherein the angle preferably can be up to 45°, in particular up to 30°, in a horizontal and/or vertical direction.

According to another preferred embodiment, the gripping area of the push handle can also be arranged vertically to the longitudinal direction of the shopping cart or at an angle, preferably up to 45° and in particular up to 30°. Likewise in this embodiment, when gripping the push handle naturally from outside, a position of the forearms is automatically reached, whose direction of movement is directed toward the body.

In both designs mentioned, the natural arm position of the shopper pushing the cart is such that the elbows are slightly flexed, and the palms of the hands are facing each other.

It can also be considered to arrange the push handle in such a way that it is arranged vertically to the longitudinal axis of the carriage and horizontally in space or at an angle to this arrangement. However, the effect according to the invention occurs only if the gripping area when naturally gripping the push handle lies at the underside, because only then is the direction of movement of the forearms directed toward the body. If, however, the handle is grasped from the front or top—distal movement—the effect according to the invention is not achieved.

If two push handles are provided on the shopping cart, these are preferably arranged at a distance between 50 cm and 90 cm from each other, preferably 60 cm to 80 cm.

The gripping area of the push handle preferably has a distance of 70 cm to 130 cm to the ground.

The push handles can have different shapes, in particular bar-shaped, oval, oval downwardly open, circular, circular downwardly open, rectangular, or rectangular downwardly open.

BRIEF DESCRIPTION OF THE DRAWINGS

The invention will hereinafter be explained more closely with reference to drawings.

There are shown:

FIG. 1 a shopping cart with differently arranged push handles

FIG. 1 shows shopping carts in a side view. The grip area 3 of the push handle 2 is formed by the upper part of the same.

FIG. 1a shows the push handle in an arrangement in the longitudinal direction of the shopping cart, whereas FIG. 1b and FIG. 1c show the push handles at an angle to the longitudinal direction of the shopping cart.

FIG. 2 shows different realizations of the push handle.

DETAILED DESCRIPTION

Figure 2C:
FIG. 2 various embodiments of hand grips
FIG. 2a shows a bar-shaped realization, FIG. 2b an annular realization and FIG. 2c an oval realization.
FIG. 2d shows a rectangular realization and FIG. 2e and FIG. 2f downwardly open ring-shaped or oval-shaped realizations.
FIG. 2g shows another downwardly open embodiment of the push handle.
Figure 2F:
Figure 2B:
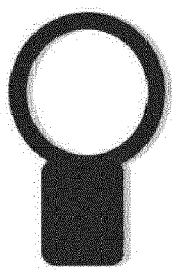
Figure 2E:
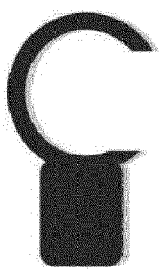
Figure 2A:
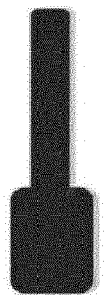
Figure 2D:
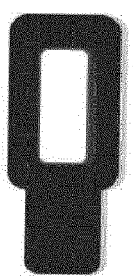
Figure 2G:
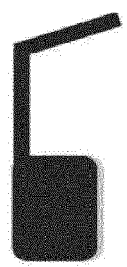

The push handles are preferably made of plastic or metal, and can preferably be equipped in the gripping area with a material which is pleasant for the hand, such as plastic.

The advantages of the shopping cart according to the invention are documented below by a test:

Test

Two shopping carts were prepared for the test practice. For this purpose, flat crossbars were attached to the shopping carts in order to make the exertion of pressure more natural for the participants, once from below—proximal movement—and the other time from above—distal movement. In order to improve the exertion of pressure from below, the flat crossbar was set 15 cm higher than the crossbar of the shopping cart, which was supposed to cause the stretching movement—distal movement.

The test participants were instructed to push one of the two shopping carts through a simulated shopping mall and go shopping. To ensure the correct arm position, the test participants were made to believe that physiological parameters would be recorded. For this purpose, the test participants should press their hands on two skin conductance plates.

These skin conductance plates were attached to the underside of the crossbar in the embodiment according to the invention for exerting pressure from below, whereby a proximal approach position was achieved. In the shopping cart which was supposed to bring about a distal stretching posture, the skin conductance plates were attached to the upper side of the crossbar. This realization of the shopping carts was intended to make the instructions regarding the arm position appear plausible and unsuspicious.

In order to carry out the shopping task, the test participants pushed the respective shopping cart to a table which was set up 10 m away and on which 13 specific products were offered at customary market prices Once arrived at the table, the test participants were able to examine the products and note in a questionnaire how much they would buy from each product at the offer price. The participants then pushed the shopping cart back to the starting point and answered further control questions.

The results of this test show that the test participants who shoved the shopping cart having proximal arm position, i.e., the arm position according to the invention, bought both more vicious and virtuous products than the group who shoved the cart with distal arm position, i.e., not in accordance with the invention. With regard to the vicious and virtuous products, expenditure averaged EUR 12.08 and EUR 11.74 respectively for the arm position according to the invention, and for the group having the arm position not in accordance with the invention expenditure averaged EUR 9.88 for vicious and EUR 8.69 for virtuous products. The effect of arm position according to the invention on the buying behavior was qualified by the fact that there was no significant difference in the effect on different product groups, vicious versus virtuous products. This means that the arm position according to the invention has an equally stimulating effect on consumption in the various product groups.

In a further text, an amount of EUR 25.61 could be determined for wine bottles with an arm position according to the invention, compared to EUR 20.54 for an arm position not in accordance with the invention. For candles, the difference was EUR 10.54 according to the invention and EUR 6.42 not in accordance with the invention.

These results show that the test subjects who pushed the shopping cart with an arm position toward the body, i.e., according to the invention, spent about 28% more in a hypothetical shopping situation than the respondents who pushed the shopping cart with their arms outstretched, i.e., not according to the invention.

The invention claimed is:

1. A shopping cart structured and arranged to increase customer purchasing, comprising a pair of push handles, each push handle having a gripping region arranged in a longitudinal direction of the shopping cart or at an angle of up to 30° towards the longitudinal direction of the shopping cart, wherein each push handle has a shape selected from the group of oval downwardly open, circular, circular downwardly open, rectangular, or rectangular downwardly open.

2. The shopping cart according to claim 1, wherein two push handles on the shopping cart are arranged at a distance of between 60 cm and 80 cm from each other.

3. The shopping cart according to claim 1, wherein the gripping region is further arranged behind a crossbar attached to the shopping cart.

4. The shopping cart according to claim 1, wherein the gripping region is at least partially vertical.

5. The shopping cart according to claim 1, wherein the gripping region of the push handle is arranged in such a way that when gripping the push handle to push the cart, the elbows are slightly flexed, and the palms of the hands are facing each other.

6. The shopping cart according to claim 1, wherein two push handles on the shopping cart are arranged at a distance of between 50 cm and 90 cm from each other.

7. The shopping cart according to claim 1, wherein the gripping area of the push handle has a distance of 70 cm to 130 cm relative to the ground.

8. A method for positively influencing the buying behavior of a user, comprising providing a shopping cart having a push handle arranged in a longitudinal direction of the shopping cart or at an angle of up to 30° towards the longitudinal direction of the shopping cart in horizontal or vertical direction, wherein the shopping cart has two push handles, each push handle has a shape selected from the group of oval downwardly open, circular, circular downwardly open, rectangular, or rectangular downwardly open, whereby the buying behavior of the user is positively influenced in that spending is increased.

9. The method of claim 8, wherein two push handles on the shopping cart are arranged at a distance of between 60 cm and 80 cm from each other.

10. The method of claim 8, wherein the push handle includes a gripping region, the gripping region further arranged behind a crossbar attached to the shopping cart.

11. The method of claim 8, wherein the push handle includes a gripping region, the gripping region at least partially vertical.

12. The method of claim 8, wherein the push handle includes a gripping region, the gripping region of the push handle arranged in such a way that when gripping the push handle to push the cart, the elbows are slightly flexed, and the palms of the hands are facing each other.

13. The method of claim 8, wherein the shopping cart has two push handles, the two push handles arranged at a distance of between 50 cm and 90 cm from each other.

14. The method of claim 8, wherein the push handle includes a gripping region, the gripping region of the push handle having a distance of 70 cm to 130 cm relative to the ground.

\* \* \* \* \*